United States Patent
Chang et al.

[11] Patent Number: 5,256,282
[45] Date of Patent: Oct. 26, 1993

[54] AERATOR FOR AN AQUARIUM

[76] Inventors: Yichao Chang; Luping Wand, both of 42-30 College Point Blvd., Flushing, N.Y. 11355

[21] Appl. No.: 4,054
[22] Filed: Jan. 13, 1993
[51] Int. Cl.$^5$ .............................. A01K 63/04
[52] U.S. Cl. .................. 210/169; 261/122.1; 119/263
[58] Field of Search ........ 210/169, 416.2, 150, 210/221.2; 119/5; 261/122.1

[56] References Cited

U.S. PATENT DOCUMENTS

| | | | |
|---|---|---|---|
| 3,575,350 | 4/1971 | Willinger | 210/169 |
| 3,970,731 | 7/1976 | Oksman | 261/122.1 |
| 4,007,240 | 2/1977 | Gosden | 261/122.1 |
| 4,118,447 | 10/1978 | Richter | 261/122.1 |
| 4,481,905 | 11/1984 | Fonseca | 210/169 |
| 4,557,879 | 12/1985 | Weber | 261/122.1 |
| 4,606,867 | 8/1986 | Eguchi | 261/122.1 |
| 4,776,127 | 10/1988 | Jackson | 119/5 |

Primary Examiner—Peter Hruskoci
Assistant Examiner—Robert J. Popovics
Attorney, Agent, or Firm—Michael I. Kroll

[57] ABSTRACT

An aerator for an aquarium is provided which consists of a structure placed onto a bottom of the aquarium holding water therein, for introducing small air bubbles into the water, so that the air will mix with and enhance the water, to allow fish to better breathe within the water.

5 Claims, 2 Drawing Sheets

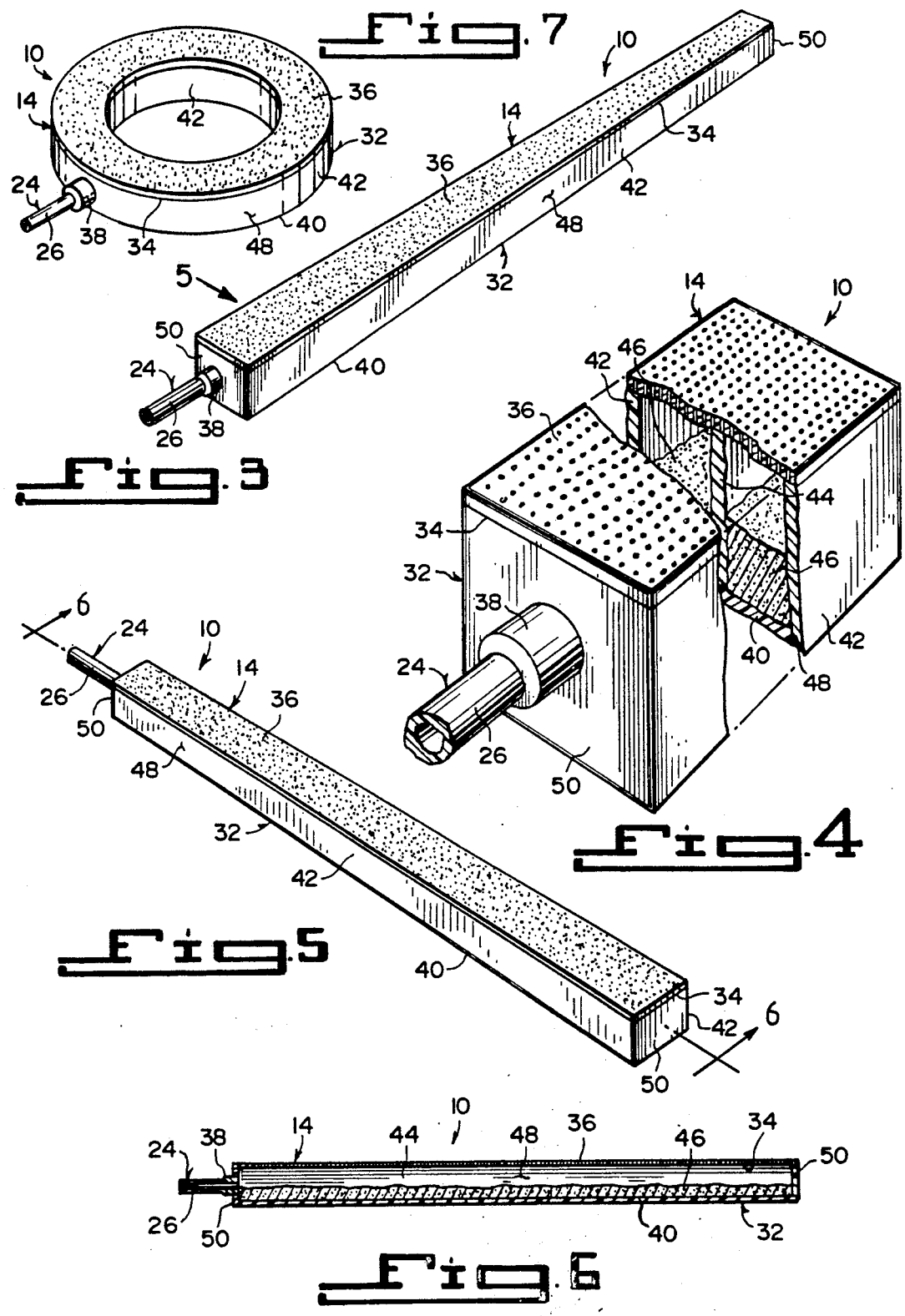

AERATOR FOR AN AQUARIUM

BACKGROUND OF THE INVENTION

1. Field of the Invention

The instant invention relates generally to aquariums and more specifically it relates to an aerator for an aquarium.

2. Description of the Prior Art

Numerous aquariums have been provided in prior art that are water-filled enclosures in which fish, other aquatic animals and often plants are kept. While these units may be suitable for the particular purpose to which they address, they would not be as suitable for the purposes of the present invention as heretofore described.

SUMMARY OF THE INVENTION

A primary object of the present invention is to provide an aerator for an aquarium that will overcome the shortcomings of the prior art devices.

Another object is to provide an aerator for an aquarium which will introduce small air bubbles into the water, so that the air will mix and enhance the water, to allow fish to better breathe within the water.

An additional object is to provide an aerator for an aquarium that is fabricated out of durable materials, so that the aerator will operate over a long period of time and will not block up during operation.

A further object is to provide an aquarium aerator that is simple and easy to use.

A still further object is to provide an aquarium aerator that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 3 is a perspective view of the first embodiment per se.

FIG. 4 is an enlarged perspective view of the first embodiment with parts broken away and in section showing the internal structure therein.

FIG. 5 is a perspective view of the first embodiment taken in direction of arrow 5 in FIG. 3.

FIG. 6 is a cross sectional view taken along line 6—6 in FIG. 5.

FIG. 7 is a perspective view of the second embodiment per se.

DETAILED DESCRIPTION OF THE PREFERRED EMBODIMENTS

Figure 1:
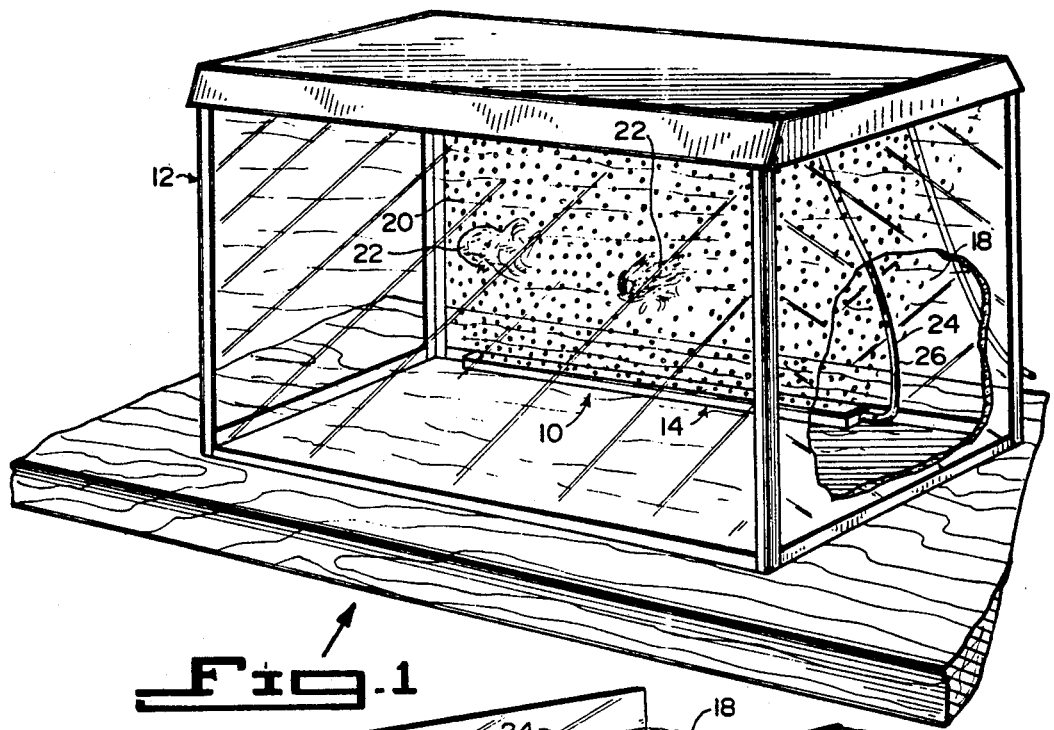
FIG. 1 is a perspective view of a first embodiment of the instant invention installed within a bottom of an aquarium.

Turning now descriptively to the drawings, in which similar reference characters denote similar elements throughout the several views, FIGS. 1 through 7 illustrate an aerator 10 for an aquarium 12, which consists of a structure 14 placed onto the bottom 16 of the aquarium 12 holding water 18 therein for introducing small air bubbles 20 into the water 18. The air will mix with an enhance the water 18, to allow fish 22 to better breathe within the water 18.

A conduit 24 extends from one side of the small air bubbles introducing structure 14 for carrying a flow of air through the conduit 24 into the small air bubbles introducing structure 14. The conduit 24 is an elongate flexible tube 26.

The aerator 10 for the aquarium 12, further includes a mechanism 28 for forcing the flow of air through the elongate flexible tube 26 and into the small air bubbles introducing structure 14. The air forcing mechanism 28 is an air pump 30 coupled to a first end of the elongate flexible tube 26.

The small air bubbles introducing structure 14 contains an elongated housing 32 having an open top 24, with a porous cover 36 secured to the open top 14 of the housing 32. A connector 38 extends from the housing 32. The connector 38 is coupled to a second end of the elongate flexible tube 26, so that the flow of forced air can pass through the porous cover 34 causing the small air bubbles 20 to be introduced into the water 18 within the aquarium 12.

The housing 32 is generally E-shaped in cross section and includes a bottom wall 40, a pair of upstanding side walls 42 and a central portion 44 to add strength to the housing 32. A weighted material 46 is applied onto the bottom wall 40 of the housing 32, so that the housing 32 will positively sit upon the bottom 16 of the aquarium 12. The housing 32 is fabricated out of a non-porous durable material 48, such as plastic and similar materials.

As shown in FIGS. 1 through 6, the housing 32 has a straight rectangular configuration with a pair of end walls 50. The porous cover 36 has a straight rectangular configuration, which will fit over and be secured to the open top 34 of the housing 32, whereby the connector 38 extends from one of the end walls 50 of the housing 32.

Figure 2:
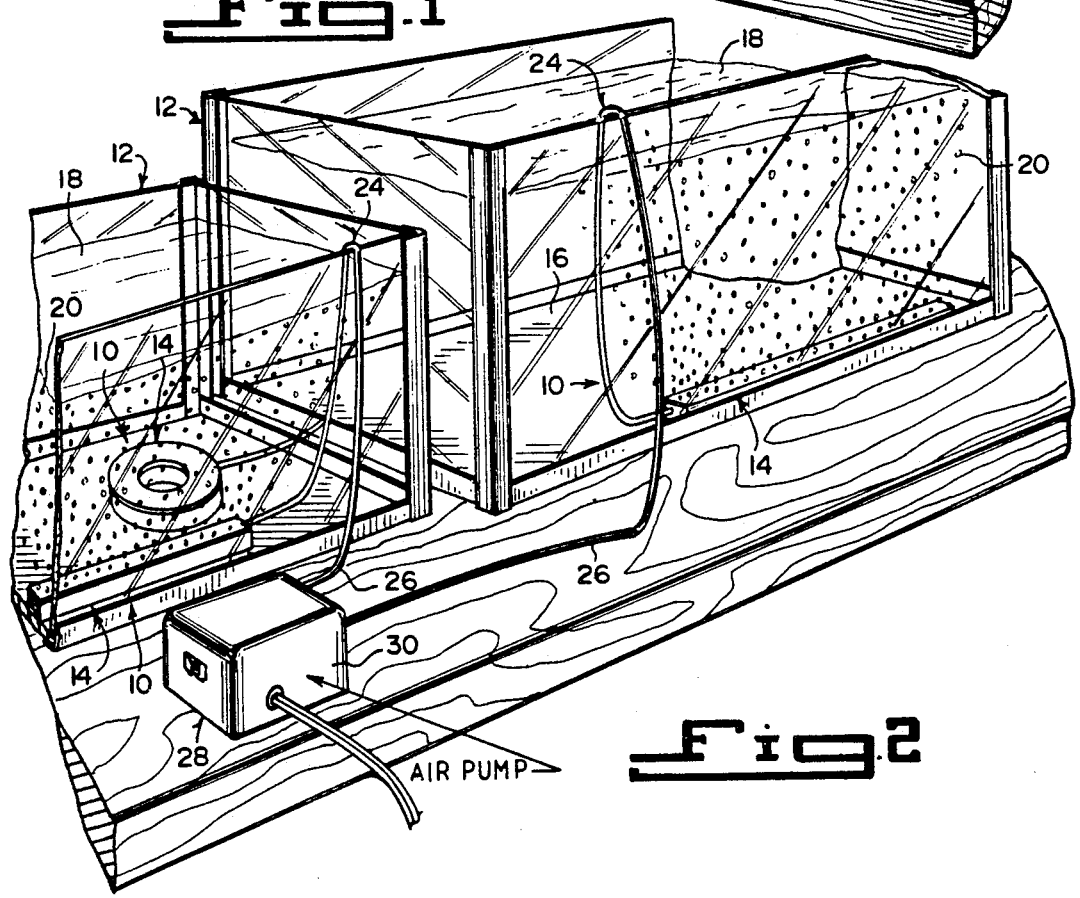
FIG. 2 is a perspective view of the first embodiment and a second embodiment of the instant invention installed on the bottom of two aquariums and operated by an air pump.

As shown in FIG. 2 and 7, the housing 32 has a circular configuration. The porous cover 36 has a circular configuration, which will fit over and be secured to the open top 34 of the housing 32, whereby the connector 38 extends from one of the side walls 42 of the housing 32.

The aerator 10 can come in different sizes and lengths to properly fit into different sized aquariums 12. After the aerator 10 is connected to the elongate flexible tube 26 and placed into the water 18 in the bottom 16 in the aquarium 12, a person should wait approximately five minutes before turning on the air pump 30.

LIST OF REFERENCE NUMBERS 10 aerator
12 aquarium
14 structure
16 bottom of 12
18 water
20 small air bubbles in 18
22 fish
24 conduit
26 elongate flexible tube
28 air forcing mechanism 30 air pump
32 housing
34 open top in 32
36 porous cover
38 connector
40 bottom wall of 32
42 side wall of 32
44 central partition of 32
46 weighted material
48 non-porous durable material 32
50 end wall of 32

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. In combination, a water holding aquarium and aerator means, placed beneath the water upon the bottom of said aquarium, for bubbling air up through the water so as to enhance the water and allow fish to better breathe, said aerator means comprising;
    means, resting on the bottom of said aquarium, for introducing small air bubbles into the water;
    an elongate flexible tube, extending from one side of said means for introducing air bubbles, for carrying a flow of air to said means for introducing air bubbles;
    air pump means, coupled to a first end of said elongate flexible tube, for forcing air through said tube and into said means for introducing small air bubbles, wherein;
    said means for introducing air bubbles further comprises;
        an elongated hollow housing, generally E-shaped in cross section and having a open top, said housing including;
        a bottom wall having elongated edges,
        a pair of side walls upstanding from said elongated edges of said bottom wall,
        an elongated central partition wall upstanding from said bottom wall between said side walls and substantially parallel to said side walls;
    an elongated porous cover secured to said open top of said housing;
    a connector extending from said elongated housing and coupled to a second end of said elongate flexible tube so that the flow of forced air can pass through said porous cover causing the small air bubbles to be introduced into the water within said aquarium.

2. An aerator for an aquarium as recited in claim 1, further including weighted material applied onto said bottom wall of said elongated housing, so that said elongated housing will positively sit upon the bottom of said aquarium.

3. An aerator for an aquarium as recited in claim 2, wherein said elongated housing is fabricated out of a non-porous durable material.

4. An aerator for an aquarium as recited in claim 3, further including:
    a) said elongated housing having a straight rectangular configuration with a pair of end walls; and
    b) said porous cover having a straight rectangular configuration, which will fit over and be secured to said open top of said elongated housing, wherein said connector extends from one of said end walls of said elongated housing.

5. An aerator for an aquarium as recited in claim 3, further including:
    a) said elongated housing having a circular configuration; and
    b) said porous cover having a circular configuration, which will fit over and be secured to said open top of said elongated housing, wherein said connector extends from one of said side walls of said elongated housing.

* * * * *